United States Patent [19]

Welch

[11] Patent Number: 4,783,114

[45] Date of Patent: Nov. 8, 1988

[54] VEHICLE DOOR AND ARM REST

[75] Inventor: Jeffrey A. Welch, Troy, Mich.

[73] Assignee: General Motors Corporation, Detroit, Mich.

[21] Appl. No.: 117,073

[22] Filed: Nov. 5, 1987

[51] Int. Cl.⁴ .............................................. B60J 9/00
[52] U.S. Cl. .................................... 296/153; 280/751
[58] Field of Search ...................... 296/146; 280/751; 49/502

[56] References Cited

U.S. PATENT DOCUMENTS

| | | | |
|---|---|---|---|
| 2,897,000 | 7/1959 | Hart et al. | 296/153 |
| 2,922,674 | 1/1960 | Hollerbach | 296/146 |
| 3,362,749 | 1/1968 | Clement | 296/153 |
| 3,387,881 | 6/1968 | Stepanek | 296/153 |
| 3,801,149 | 4/1974 | Reimann | 296/153 |
| 3,808,743 | 5/1974 | Renner et al. | 296/153 |
| 3,874,119 | 4/1975 | Renner et al. | 49/502 |
| 3,989,275 | 11/1976 | Finch | 280/751 |

*Primary Examiner*—Robert R. Song
*Attorney, Agent, or Firm*—Charles E. Leahy

[57] ABSTRACT

A vehicle door includes an outer panel and an inner panel attached together and defining a space for mounting the window and window regulator. A door trim assembly mounted on the inner panel includes an energy absorbing member, preferably of plastic or other foam matrial, and a trim panel which overlies the energy absorbing member and provides a decorative surface. An arm rest is mounted to project inboard from the trim panel and overlies a cavity provided in the door trim assembly. The arm rest is mounted on the door trim assembly by a yieldable mount which yields upon imposition of a predetermined level of force against the arm rest by the seated occupant whereby the arm rest is collapsed into the cavity and assumes a substantially flush relationship with the door trim assembly.

6 Claims, 2 Drawing Sheets

VEHICLE DOOR AND ARM REST

The invention relates to a vehicle door and more particularly to an arm rest construction which collapses into a cavity in the door upon imposition of a lateral force thereagainst.

BACKGROUND OF THE INVENTION

It is well known in motor vehicles to provide a decorative door trim panel assembly on the inner panel of the door. It is also well known to provide an arm rest on the door and projecting inboard from the door trim panel to provide a convenient rest for the occupant's arm.

The prior art has recognized that the door trim panel may be comprised of a foam material which collapses and absorbs energy upon imposition of a lateral force thereagainst. The prior art has also recognized that the arm rest may be comprised of a foam or honeycomb structure which will yield laterally upon imposition of a force thereagainst.

SUMMARY OF THE INVENTION

The present invention provides a new and improved door trim and arm rest structure in which the arm rest overlies a cavity in the door and is mounted by a yieldable mounting arrangement whereby the imposition of a predetermined level of force against the arm rest by the seated occupant causes the arm rest to collapse into the cavity and obtain a generally flush relation with the door trim panel.

According to the invention a vehicle door includes an outer panel and an inner panel attached together and defining a space for mounting the window and window regulator. A door trim assembly mounted on the inner panel includes an energy absorbing member, preferably of plastic or other foam material, and a trim panel which overlies the energy absorbing member and provides a decorative surface. An arm rest is mounted to project inboard from the trim panel and overlies a cavity provided in the door trim assembly. The arm rest is mounted on the door trim assembly by a yieldable mount which yields upon imposition of a predetermined level of force against the arm rest by the seated occupant whereby the arm rest is collapsed into the cavity and assumes a substantially flush relationship with the door trim assembly.

BRIEF DESCRIPTION OF THE DRAWINGS

These and other objects, features and advantages of the invention will become apparent upon consideration of the description of the preferred embodiment, and the appended drawings in which.

DESCRIPTION OF THE PREFERRED EMBODIMENT

Figure 1:
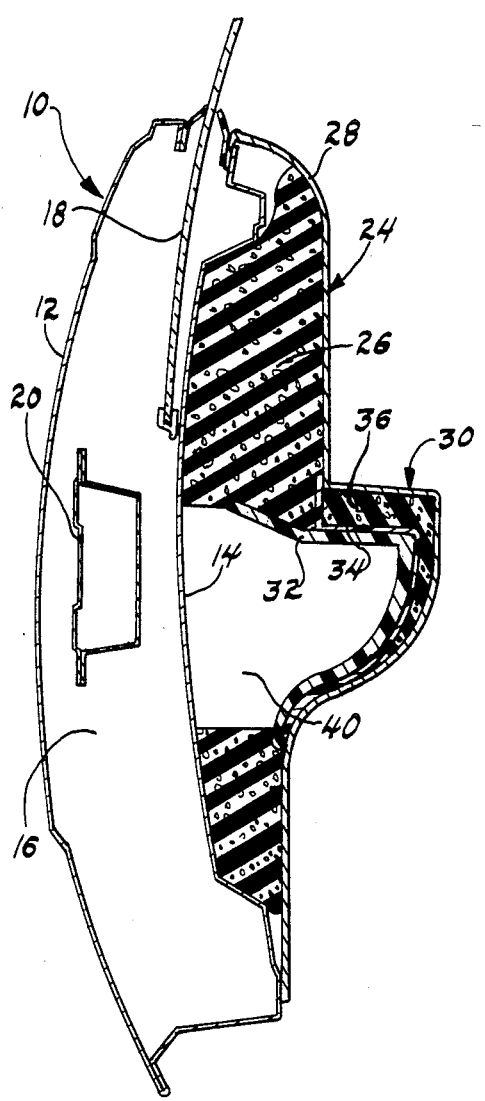
FIG. 1 is a side elevational view through a vehicle door showing the door trim assembly and arm rest according to the present invention.

Referring to FIG. 1, there is shown a section through a vehicle door 10. The door 10 includes an outer panel 12 and an inner panel 14 which are attached together in spaced apart relation by welding and hem flanging the peripheral edges. The space 16 defined between the outer panel 12 and inner panel 14 provides a storage space for the window panel 18, and a window regulator, not shown, which raises and lowers the window panel 18. In addition, guard beam 20 is situated in the space 16 and extends longitudinally between the front and rear of the door 10.

The inside of the inner panel 14 is concealed and padded by a door trim assembly generally indicated at 24. The door trim assembly 24 includes an energy absorbing member 26 comprised of an energy absorbing material, such as expanded polystyrene foam. The energy absorbing member 26 is covered by a trim panel 28 which overlies the energy absorbing member 26 and is formed of suitable material such as pressed hardboard or plastic. The trim panel 28 is in turn covered with a suitable decorative material such as vinyl, leather, cloth, carpeting, or the like, not shown.

An arm rest structure 30 is also provided on the door. As shown in FIG. 1, the arm rest 30 may be a foam plastic assembly molded separate from the energy absorbing member 26 and includes a substrate 32 of high density foam, a molded plastic cap 34 to provide additional strength and rigidity, and a low density foam layer 36 to provide cushioning for the arm rest assembly. The arm rest 30 is attached to the energy absorbing member 26 by adhesive or other suitable means. As seen in FIG. 1, the energy absorbing member 26 includes a cavity 40 which underlies the arm rest 30.

It will be understood that the imposition of an occupant load imposed laterally against the arm rest 30 will cause the arm rest 30 to collapse into the cavity 40 as permitted by breaking, tearing or bending of the arm rest assembly, including its substrate 32, cap 34, and cushion 36.

As seen in FIG. 1, it is desirable that the depth of the cavity 40 defined within the energy absorbing member 26 be substantially equal to the distance by which the arm rest 30 projects laterally inboard of the energy absorbing member 26 into the passenger compartment. Accordingly, when the arm rest 30 is collapsed laterally outboard into the cavity 40, the arm rest 30 assumes a substantially flush relation with the inside surface of the door.

Figure 2:
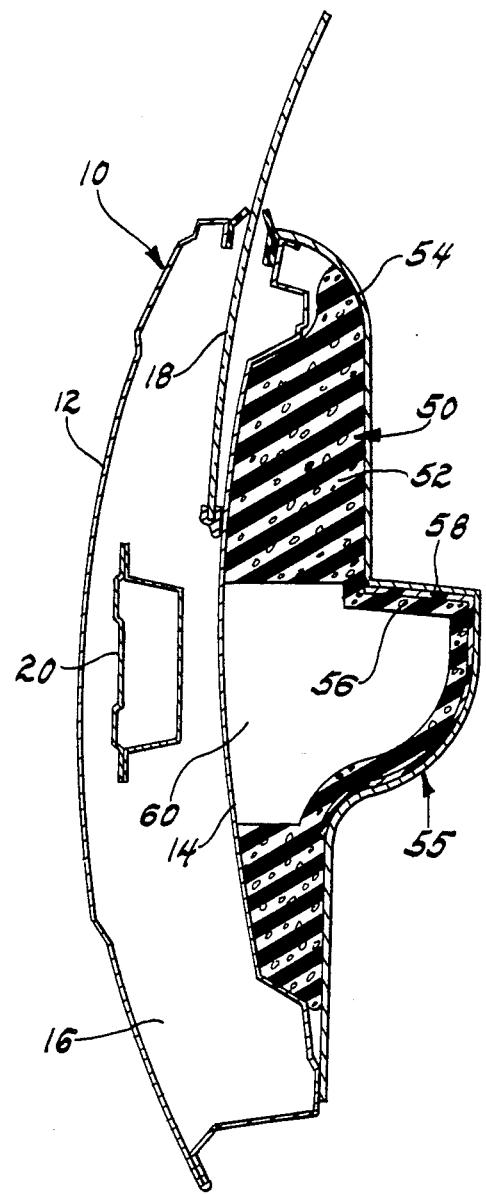
FIG. 2 is a view similar to FIG. 1 but showing a second embodiment of the invention.

FIG. 2 shows a second embodiment of the invention in which the outer panel 12, inner panel 14, space 16, window 18 and guard beam 20 are identical with those of FIG. 1. A door trim assembly generally indicated at 50 includes an energy absorbing member 52 covered by trim panel 54. An arm rest 55 includes an integrally molded arm rest portion 56 of the energy absorbing member 52 which is also of foam and which may be either of the same density as the main body of the energy absorbing member 52 or the arm rest portion 56 may be a higher density foam for increased rigidity. A thermoplastic cover 58 is bonded to the arm rest portion 56 to add additional rigidity. Upon imposition of a lateral force against the arm rest, the arm rest portion 56 of the energy absorbing member 52 and the cap 58 yield inwardly enabling the arm rest to collapse within a cavity 60 provided in the energy absorbing member 52.

Figures 3, 4:
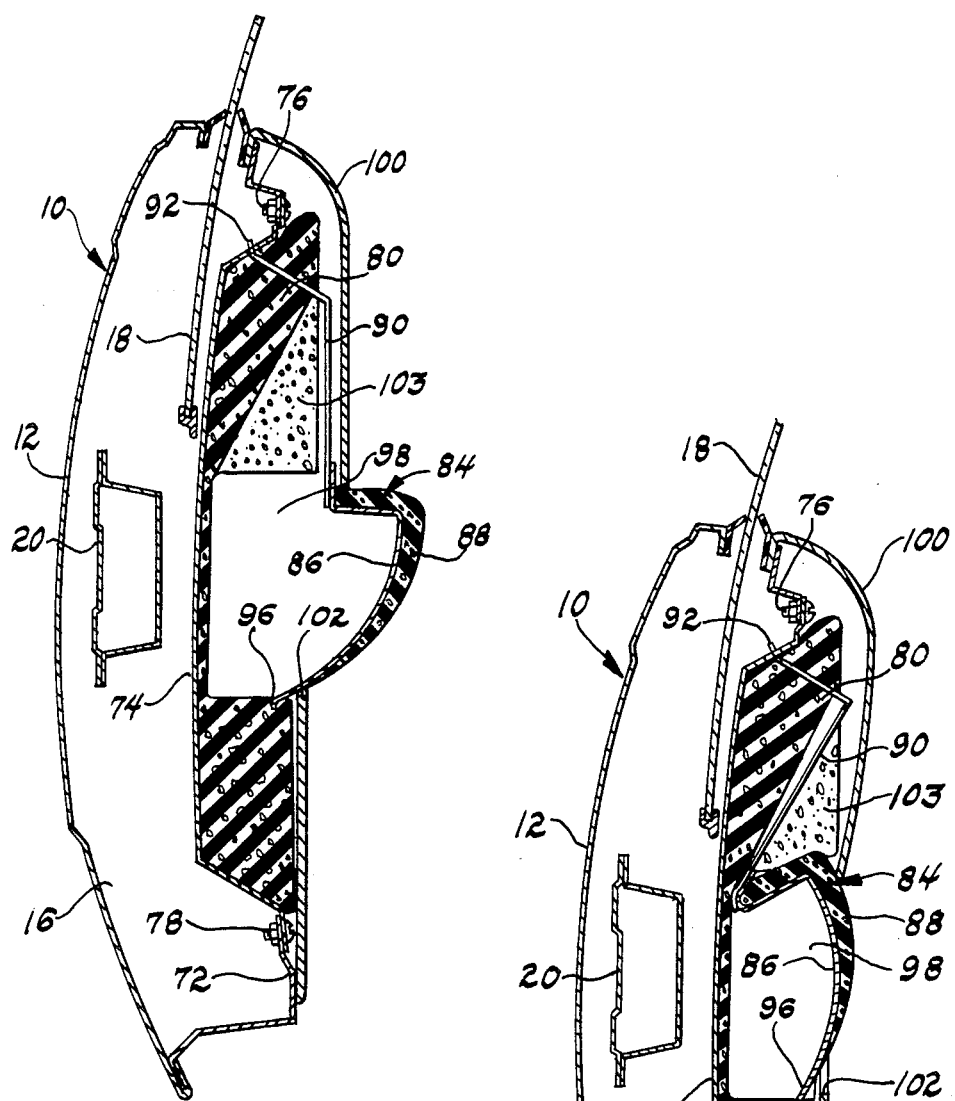
FIG. 3 is a view similar to FIG. 1 but showing a third embodiment of the invention.
FIG. 4 is a view similar to FIG. 3 but showing the arm rest collapsed into a cavity in the door trim assembly by the imposition of an occupant force thereagainst.

FIGS. 3 and 4 show a third embodiment of the invention which has those elements which are common to the first and second embodiments designated by like numerals The door inner panel 72 includes a large cutout which receives a support panel 74 of sheet metal which is adapted for attachment to the inner panel 72 by nut and bolt assemblies 76 and 78. The energy absorbing member 80, shown as molded foam, may be molded in situ in the support panel 74. The arm rest structure generally indicated at 84 includes a sheet metal substrate 86 covered by molded foam cushion 88. A plurality of hanger straps, one of which is shown at 90, includes an upper end 92 which extends through an aperture in the support panel 74 and through the energy absorbing member 80. The lower edge of the sheet metal substrate 86 includes a tab or flange 96 which seats in the energy absorbing member 80 at the lower part of the cavity 98. The door trim panel 100 overlies the energy absorbing member 80 and has a central opening 102 which fits around the arm rest structure 84.

As best seen in FIG. 4, the imposition of a lateral force against the arm rest assembly 84 causes the arm rest assembly to pivot inwardly into the cavity 98 about the tab 96 at the lower end thereof as permitted by the yielding of the hanger strap 90. In order to permit the outboard yielding movement of the hanger strap 90, the energy absorbing member 80 is molded with integral clearance slots 103 which align with the hanger straps 90 to permit such outboard movement of the hanger straps. As seen in FIG. 4, the arm rest assembly 84 travels laterally outboard to assume a generally planar relationship with the trim panel 100 so that the door presents a substantially planar surface facing toward the seated occupant.

Thus it is seen that the invention provides a new and improved vehicle door trim assembly with an arm rest which is yieldably mounted n the door for collapse into a cavity provided in an energy absorbing member underlying the door trim panel.

It will be understood that the energy absorbing member as shown in the drawings is comprised of a molded foam structure, it would be possible to employ alternate energy absorbing materials and constructions, such as a honeycomb plastic or metal material having a suitable cavity therein for enabling the collapsing movement of the arm rest. Furthermore, it will be understood that the particular arm rest constructions and the mountings of the arm rest are only the door art illustrative of preferred arrangements, construction and materials for enabling the outboard collapse thereof. However, the invention is not limited to these particular arrangements, but rather the scope of the invention is determined by reference to the appended claims.

The embodiments of the invention in which an exclusive property or privilege is claimed are defined as follows:

1. A vehicle door structure comprising:
a door including an outer panel and an inner panel attached together and defining a cavity therebetween;
a door trim assembly mounted on the inner panel and including a trim panel having at least a portion thereof spaced laterally inboard from the inner panel to define a space therebetween, an armrest, and means mounting said armrest in overlying relationship with the space between the inner panel and the trim panel, said mounting means being yieldable upon the imposition of a predetermined level of force against the armrest whereby the armrest collapses into the space between the trim panel and the door inner panel.

2. A vehicle door structure comprising:
a door including an outer panel and an inner panel attached together and defining a cavity therebetween;
an energy absorbing member mounted on and overlying the inner panel;
a trim panel mounted on the inner panel and overlying the energy absorbing member;
an armrest;
means yieldably mounting said armrest on the door for lateral outboard movement upon the imposition of a predetermined level of force against the armrest by the seated occupant;
and said energy absorbing member having means adapted to receive and permit said lateral outboard movement of the armrest.

3. A vehicle door structure comprising:
a door including an outer panel and an inner panel attached together and defining a cavity therebetween;
an energy absorbing member mounted on and overlying the inner panel and having an armrest carried thereon and having a cavity formed therein underlying the armrest;
a trim panel mounted on the inner panel and overlying the energy absorbing member and having an armrest portion overlying the armrest of the energy absorbing member;
said energy absorbing member being adapted for yieldable laterally outboard movement upon the imposition of a predetermined level of force thereagainst by the occupant whereby the armrest is yieldably received in the cavity underlying the armrest.

4. The door structure of claim 3 in which the energy absorbing member is a molded foam member of relatively low density and a portion thereof provides an integral armrest of a higher density to provide a more substantial structural rigidity and yield in response to the force imposed thereon.

5. The door structure of claim 3 in which the energy absorbing member is a molded foam member and the armrest is formed integrally therewith includes a molded plastic cap attached to the armrest.

6. A vehicle door structure comprising:
a door including an outer panel and an inner panel attached together and defining a cavity therebetween;
an armrest;
at least one hanger strap having one end attached to the armrest and the other end attached to the inner panel to suspend and support the armrest;
an energy absorbing member mounted on and overlying the inner panel and having a cavity formed therein underlying the armrest;
a trim panel mounted on the inner panel and overlying the energy absorbing member;
said energy absorbing member having a clearance space therein to permit the hanger strap to yield laterally outboard upon laterally outboard yielding movement of the armrest upon the imposition of a predetermined level of force thereagainst by the occupant whereby the armrest is yieldably received in the cavity underlying the armrest.

* * * * *